Feb. 26, 1924.

M. J. CARLSON 1,485,247

TEST INDICATOR

Filed April 29, 1922

Maurice J. Carlson,
INVENTOR

BY Victor J. Evans
ATTORNEY

WITNESS: Fred W. Ely,

Patented Feb. 26, 1924.

1,485,247

UNITED STATES PATENT OFFICE.

MAURICE J. CARLSON, OF JERSEY CITY, NEW JERSEY.

TEST INDICATOR.

Application filed April 29, 1922. Serial No. 557,260.

*To all whom it may concern:*

Be it known that I, MAURICE J. CARLSON, a citizen of the United States, residing at Jersey City, in the county of Hudson, and State of New Jersey, have invented new and useful Improvements in Test Indicators, of which the following is a specification.

This invention relates to measuring devices.

More particularly, the invention relates to instrumentalities for testing work and for indicating variations therein.

Some of the objects of the present invention are: to produce a comparatively simple, practical and accurate device of the character mentioned; to obviate lost motion; to provide novel and simple means for reversing the indicator or pointer which forms part of the device so that the device may be readily used horizontally and vertically on flat and curved surfaces of divers pieces of work. With these and other objects in view the invention resides in the particular provision, construction, relative disposition, and operation of parts hereinafter fully described and illustrated in the accompanying drawing, in which:

Figure 1:
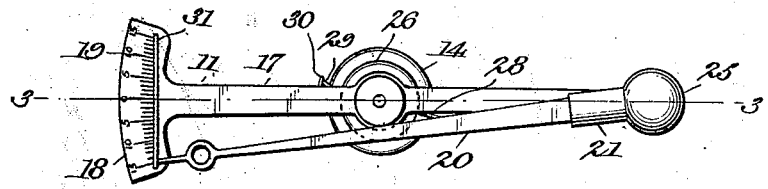
Figure 1 is a plan view.
Figure 2:
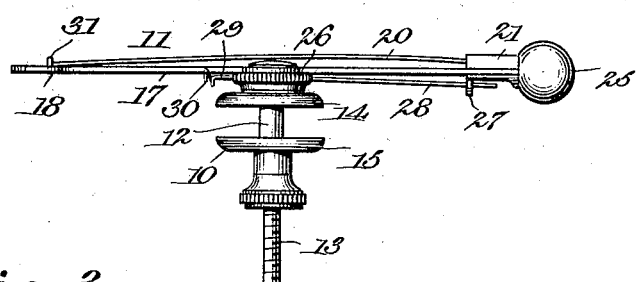
Figure 2 is a side elevation.
Figure 3:
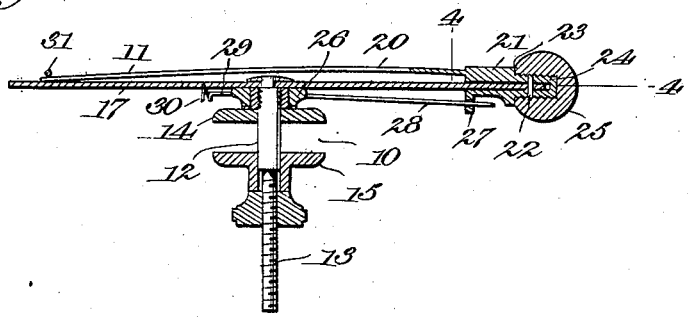
Figure 3 is a sectional view taken on the line 3—3, Figure 1.
Figure 4:
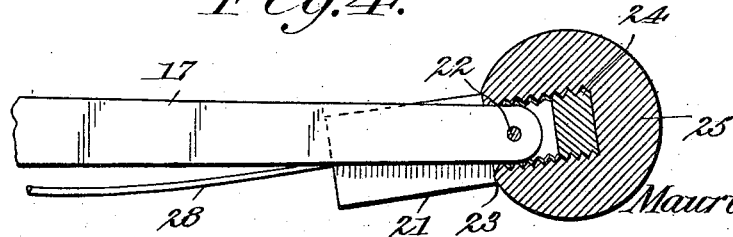
Figure 4 is an enlarged detail sectional view taken on the line 4—4, Figure 3.

Referring now more particularly to the several views of the drawing, it will be apparent that, the device of the present invention comprises, generally, attaching means 10, and indicating means 11. The attaching means serves for the instant attachment of the device for instance to the spindle or the scriber of any surface gauge, whereas, the indicating means serves to show the slightest variation in a fraction of an inch in a piece of work.

The attaching means 10 includes a stem or arbor 12 which has screw-threads 13. A relatively fixed clamping disk 14 is carried by the stem 12, and a similar disk 15 is movable on the stem 12 relatively to the disk 14. A binding nut is adapted for screw threading coaction with the screw-threads 13 of the stem 12 to maintain a clamping action of the disks 14 and 15. The attaching means provides a mounting for the indicating means 11.

The indicating means 11 includes a bar 17 which is fixedly attached to an end of the stem 12 transversely thereof; the point of attachment being approximately at the center of the bar. The bar 17 is preferably in the shape of a T, to provide a portion 18 which has inscribed thereon a measuring scale 19, graduated in thirtieths of an inch on opposite sides of a zero mark which is coincident with a radial line struck through the axis of the stem 12 and along the longitudinal center line of the bar 17. A pointer 20 coacts with the scale 19 to show the variations in work being tested. The pointer 20 has pivotal movement with respect to the bar 17.

The pivotal connection of the pointer 20 is effected by the employment of a member 21 which is bifurcated to receive the bar 17. A pivot pin 22 extends through alined holes in the member 21, and a hole in the end of the bar 17. The member 21 is reduced to provide a shoulder 23, and the reduced portion has screw-threads to provide a stud 24. In the present instance, it may be seen that the pin 22 extends through the reduced portion of the member 21. The pointer 20 is carried by the member 21. A work-contact-member 25 is employed and this member is the part of the device which "feels" the work to be tested. The member 25 is spherical in shape and has a screw-threaded bore therein thus adapting the member for attachment to the stud 24. The member 25 is screwed onto the stud 24 against the shoulder 23 to securely hold the member 25 in place on the stud 24 and therefore on the member 21. Thus any irregularities encountered by the member 25 in testing a piece of work will result in the movement of the pointer 20. This latter action is countered by a spring means which in the present construction also serves for effecting a change of the normal position of the pointer 20 with respect to the scale 19 in a manner to be explained. Arranged immediately adjacent the bar 17 is a member 26 which is capable of turning movement on the stem 12, and which is held in place between the bar 17 and the disk 14 by suitable washers. One of the furcations of the member 21 is provided with a lip 27.

A spring 28 is arranged between the member 26 and the lip 27; the spring 28 being attached to the member 26 at one end and its opposite end is movably disposed in a hole in the said lip 27. A part 29 of the spring 28 is attached to the member 26 by being brazed in a bore in said member at a point diametrically opposite to the point of similar attachment of the end of the main spring 28 to the member 26. The free end of the spring part 29 is provided with an angularly disposed loop 30 engageable with either of the side edges of the bar 17. The pointer 20 is always under the influence of the spring 28 and its part 29. By manipulating the member 26 the pointer may be moved to the desired normal position with the point thereof at either side of the zero mark of the scale 19. The pointer is limited in its movements by the opposite ends of the guide member 31 which is attached to the scale portion 18. By manipulating the member 26 the main spring part 28 may be bowed as shown in Figure 1, and the spring part 29 will be disposed to bring its loop 30 in engagement with one of the edges of the bar 17 as shown. That normally holds the point of the pointer at the lower end of the scale 19—Figure 1—and by turning the member 26 counter-clockwise the position of the point of the pointer will be reversed.

It should now be manifest that in testing a piece of work, any movement of the work-contact-member 25 will result in the movement of the pointer 20; that the normal position of the front of the pointer 20 may be reversed; that the use of numerous bearings is obviated; and that the device has a wide range of use.

What is claimed is:

1. In an indicator, a bar having a measuring-scale, a spring pressed bifurcated member having a screw-threaded stud, a pivot pin passing through portions of said screw-threaded stud and through a portion of said bar, a pointer carried by said bifurcated member which coacts with said measuring-scale, and a work-contact-member having a screw-threaded bore therein for effecting the detachable connection of said work-contact-member to said screw-threaded stud.

2. An indicator comprising attaching means, a mounting carried by said attaching means, a turnable member carried by said mounting, a bar attached to said mounting, a measuring-scale at one end of said bar, a bifurcated member having a screw-threaded stud, a pivot pin pivotally connecting said bifurcated member to said bar, a pointer connected to said bifurcated member, the said pointer coacting with said measuring-scale, a spring connecting said turnable member to said bifurcated member, and to said bar and a spherical-work-contact-member having a screw-threaded bore therein for the attachment of spherical-work-contact-member to said screw-threaded stud.

In testimony whereof I hereby affix my signature.

MAURICE J. CARLSON.